UNITED STATES PATENT OFFICE.

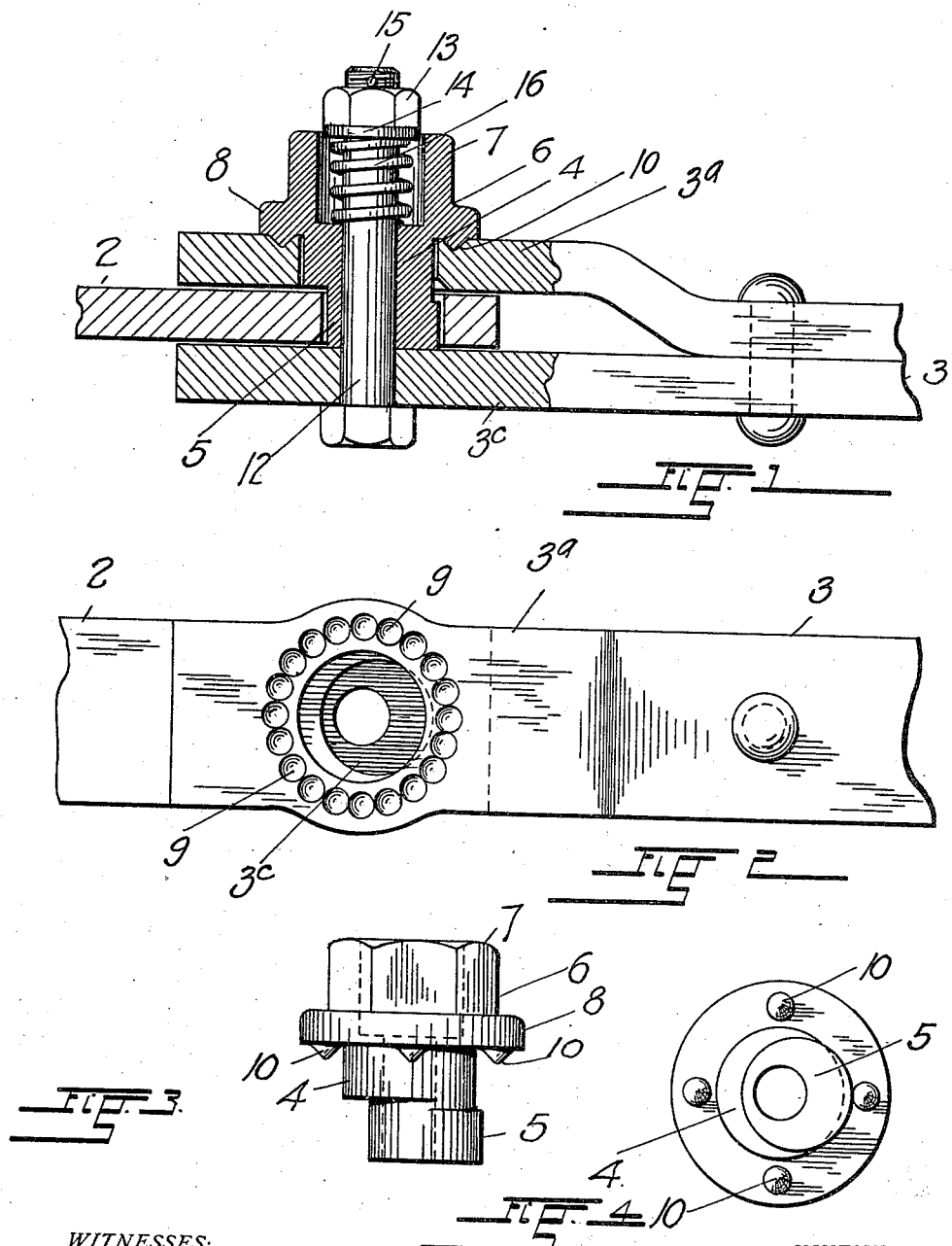

OLOF M. JOHNSON AND ESTUS R. McCONNELL, OF DENVER, COLORADO.

ADJUSTING MECHANISM.

1,044,055.  Specification of Letters Patent.  Patented Nov. 12, 1912.

Application filed March 13, 1912. Serial No. 683,630.

*To all whom it may concern:*

Be it known that we, OLOF M. JOHNSON and ESTUS R. McCONNELL, citizens of the United States, residing at Denver, in the county of Denver and State of Colorado, have invented certain new and useful Improvements in Adjusting Mechanism, of which the following is a specification.

Our invention relates to adjusting mechanism for rods, bars and other similar connections and while adapted for use on different devices, it is more particularly designed to regulate the length of the head-rod and tie-rods of split-point railway switches when by reason of wear or displacement of the rails, the switch fails to close sufficiently to bring its points in contact with the stock-rails of the track.

It is the object of our invention to provide a simple mechanism which may be readily adjusted, without the removal of any of its parts, to vary the length of a rod or bar to which it is applied, which will securely connect the sections of which said rod or bar is composed and which, irrespective of the length of time it has been in service, will always be in a condition for immediate and easy adjustment.

In the accompanying drawings in the various views of which like parts are similarly designated, Figure 1 represents a sectional view of the mechanism as applied to the head-rod of a split railway-switch. Fig. 2, a plan view of the portion of the rod at which the members of which it is composed, are joined, Fig. 3, an elevation of the adjusting key comprised in the adjusting mechanism, and Fig. 4, an underneath view of the same.

Referring more specifically to the drawings, the rod to which the mechanism is applied is composed of two longitudinal alined members 2 and 3, the end of one of which fits snugly between the branches 3ª and 3ᶜ of the bifurcated extremity of the other. The branches 3ª and 3ᶜ of the rod-member 3 are provided with axially alined, circular openings of different diameters, and the interposed part of the other member 2, has a similar opening which, when the members are in their proper relative position, is disposed eccentrically with relation to the others. The larger one of the two openings in the forked end of the member 3, and the opening in the part of the other member which lies between the branches of said end, are occupied by the relatively eccentric circular portions 4 and 5 of the shank of an adjusting key 6, whose hexagon head 7 has at its lower portion, a circular integral flange 8 which engages the exterior surface of the adjacent branch 3ª of the forked part of the rod. Arranged in the said exterior surface of the branch 3ª, in concentric relation to its opening, is a series of depressions 9 adapted to receive two or more conical lugs 10 which project from the lower surface of the flanged head of the adjusting key.

The key 6 has a bore in axial alinement with the smaller one of the two openings in the forked extremity of the member 3, the said bore being enlarged at its end within the head 7. A bolt 12 extending through the bore of the key and the therewith alined opening in the branch 3ᶜ, with its head in engagement with the exterior surface of the latter, carries at its opposite, threaded end, a nut 13 and a washer 14 which are held in place by the use of a pin 15.

A spring 16 coiled around the shank of the bolt 12, engages at its opposite ends, the washer 14 and the shoulder formed within the head 7 by the enlargement of the bore in the key, for the purpose of yieldingly maintaining the latter in its normal position in which the projections 10 on the lower surface of the head 7 occupy the depressions 9 in the member 3ª of the rod, with which they are in register.

The exterior diameters of the nut and the washer are such that during adjustment of the key 6 they may move freely into the enlargement of its bore, and the eccentric portions of the shank of the key are proportioned with relation to the depth of the openings in which they are fitted so as to permit of a sufficient longitudinal displacement of the key to move the projections 10 out of the depressions 9 they normally occupy.

When the parts are in their normal position the two members of which the rod is composed, are firmly connected by means of the bolt 12 and the key 6 which is locked against rotation by pressure of the spring 16 which maintains the projections 10 in the corresponding depressions 9.

When it is desired for any purpose to vary the length of the rod, it is but necessary to impart a partial rotation to the adjusting key by means of a wrench applied to its hexagon head. The rotary movement of the key about the bolt and within the opening in the fork in which the concentric portion 4 of its shank extends, will cause the conical lugs 10 to move out of the depressions in the outer surface of the fork, by moving the key longitudinally against the pressure of the spring. The rotary movement of the eccentric portion 5 of the key shank in the opening of the rod-section 2 will at the same time cause the latter to move longitudinally until the rod has been adjusted to its proper length when, after the wrench has been removed, the spring will automatically re-lock the key in its adjusted position by forcing the projections on the lower surface of its head into the depressions 9 with which they have been brought in register.

Having thus described our invention what we claim and desire to secure by Letters-Patent is.

1. A mechanism of the class described comprising in combination with lapping members provided with circular openings, an axially bored adjusting key normally held against rotation on said members and having relatively eccentric, circular portions which occupy the said openings, a bolt extending through the said bore, its head engaging one of said sections, a nut on said bolt, and a spring between the said nut and the said key to maintain the latter, adjustably, in its normal position.

2. A mechanism of the class described comprising in combination with lapping members provided with circular openings, an axially bored adjusting key normally held against rotation on said members and having relatively eccentric, circular portions which occupy the said openings, a bolt extending through the said bore, its head engaging one of said sections, and means connected with said bolt to maintain said key adjustably in its normal position.

3. A mechanism of the class described, comprising in combination a section having a forked portion provided with axially alined circular openings of different diameters, a section having in its end portion, extending between the branches of said fork, a similar opening, an axially bored adjusting key normally locked against rotation and having relatively eccentric portions adapted to respectively occupy the larger one of the openings in the fork of the one section, and the opening in the other section, a bolt extending through the bore in the said key, and the smaller opening of said fork, a nut on said bolt, and a spring between the said nut and the said key to maintain the latter adjustably in its normal position.

4. A mechanism of the class described comprising in combination with lapping sections provided with circular openings, an axially bored key having relatively eccentric portions adapted to occupy said openings, a bolt extending through said bore, its head engaging one of said sections, the said key and one of the sections having coöperative means to normally lock the key in its adjusted position, a nut on the said bolt, and a spring between the said nut and the key to yieldingly maintain the latter in its normal position.

5. A mechanism of the class described comprising in combination with lapping sections provided with circular openings, an axially bored, headed key having a shank composed of relatively eccentric portions adapted to occupy said openings, one of the said sections having a series of indentations concentric to its opening, and the said key having on its head, pointed projections adapted to occupy said indentations, a bolt extending through the bore of the key, its head engaging one of said sections, a nut on said bolt, and a spring between said nut and said key.

6. A mechanism of the class described, comprising in combination a section having a forked portion provided with axially alined circular openings of different diameters, a section having in its end portion extending between the branches of said fork, a similar opening, a headed, axially bored adjusting key having a shank composed of relatively eccentric, circular portions adapted to respectively occupy the larger opening in the one section and the opening in the other section, the forked section having a series of indentations concentric to its openings, and the said key having on its head, projections adapted to enter said indentations, a bolt extending through the smaller opening in the forked sections and the bore of the said key, a nut on said bolt and a spring between said nut and said key.

7. A mechanism of the class described, comprising in combination, a section having a forked portion provided with axially alined circular openings of different diameters, a section having in its end portion, extending between the branches of said fork, a similar opening, a headed, axially bored adjusting key having a shank composed of relatively eccentric, circular portions adapted to respectively occupy the larger opening in the one section and the opening in the other section, said forked section and said key having coöperative means for normally locking the latter in its adjusted position, a bolt extending through the smaller opening in the forked section and the bore of said key, a nut on said bolt, and a spring between said nut and said key.

8. A mechanism of the class described, comprising in combination, a section having a forked portion provided with axially alined, circular openings of different diameters, a section having in its end portion, extending between the branches of said fork, a similar opening, a headed, axially bored adjusting key having a shank composed of relatively eccentric, circular portions adapted to respectively occupy the larger opening in the one section and the opening in the other section, said forked section and said key having coöperative means adapted to normally lock the latter in its adjusted position and to automatically unlock the same during longitudinal movement of the key, a bolt extending through the smaller opening in the forked section and the bore of said key, a nut on said bolt, and a spring between said nut and said key.

In testimony whereof we have affixed our signatures in presence of two witnesses.

OLOF M. JOHNSON.
ESTUS R. McCONNELL.

Witnesses:
L. S. BARTLETT,
WM. DOYLE.

Copies of this patent may be obtained for five cents each, by addressing the "Commissioner of Patents, Washington, D. C."